US011872818B2

(12) United States Patent
Murashima et al.

(10) Patent No.: US 11,872,818 B2
(45) Date of Patent: Jan. 16, 2024

(54) LIQUID TANK AND IMAGE FORMING APPARATUS

(71) Applicant: KYOCERA Document Solutions Inc., Osaka (JP)

(72) Inventors: Masaki Murashima, Osaka (JP); Mitsuhiro Goda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 71 days.

(21) Appl. No.: 17/690,072

(22) Filed: Mar. 9, 2022

(65) Prior Publication Data

US 2022/0288938 A1 Sep. 15, 2022

(30) Foreign Application Priority Data

Mar. 10, 2021 (JP) ................................ 2021-038393
Feb. 28, 2022 (JP) ................................ 2022-029595

(51) Int. Cl.
*B41J 2/165* (2006.01)

(52) U.S. Cl.
CPC ................................ *B41J 2/16552* (2013.01)

(58) Field of Classification Search
CPC .................................................. B41J 2/16547
See application file for complete search history.

(56) References Cited

U.S. PATENT DOCUMENTS 10,479,089 B2 11/2019 Yoshii
2020/0279468 A1* 9/2020 Jones .................. G08B 21/182

FOREIGN PATENT DOCUMENTS

CN 113442576 A * 9/2021 ........... B41J 2/1721
JP 5223623 A * 8/1993
JP 2018-202729 A 12/2018
TW 200831300 A * 8/2008

* cited by examiner

*Primary Examiner* — Sharon Polk
(74) *Attorney, Agent, or Firm* — Studebaker & Brackett PC

(57) ABSTRACT

An image forming apparatus includes a housing, a container body, and an electrostatic capacitance sensor. The container body contains a liquid and is placed on a ground surface which is a part of the housing. The electrostatic capacitance sensor detects a change in capacitance between a side surface of the container body and the ground surface to determine a change in quantity of the liquid in the container body. The top surface of the container body is a part of the housing. The top surface and the ground surface are in electrically conductive state, a distance between the top surface and the electrostatic capacitance sensor is longer than a distance between the ground surface and the electrostatic capacitance sensor, or the top surface and the ground surface are electrically insulated, or the top surface is opened.

16 Claims, 4 Drawing Sheets

LIQUID TANK AND IMAGE FORMING APPARATUS

INCORPORATION BY REFERENCE

This application is based on and claims the benefit of priority from Japanese patent applications No. 2021-038393 filed on Mar. 10, 2021 and No. 2022-029595 filed on Feb. 28, 2022, which is incorporated by reference in its entirety.

BACKGROUND

The present disclosure relates to a liquid tank storing a liquid such as a cleaning liquid and an image forming apparatus.

An inkjet type image forming apparatus is provided with a liquid tank storing a cleaning liquid for cleaning a recording head of a head unit, for example. Such a liquid tank includes a supply liquid tank storing the liquid and a detection sensor which detects a remaining quantity of the liquid in the supply liquid tank.

The supply liquid tank is formed with an outflow port through which the liquid is supplied. The outflow port is disposed below a liquid level at a time of emptying when it is determined that the supply liquid tank is empty, so that it becomes possible to prevent air from entering through the outflow port.

In a case of the above-described liquid tank storing the cleaning liquid, when it is determined the liquid tank is empty, the liquid tank is generally discarded in order to prevent contamination of foreign matter. Therefore, it is preferable that a quantity of the liquid to be discarded, that is, the remaining quantity of the liquid is small. However, as described above, in the above-described supply liquid tank, the outflow port is formed below the liquid level at the time of emptying. Then, there is a problem that the quantity of liquid remaining at the time of emptying is increased and the liquid cannot be consumed efficiently. As the detection sensor, an electrostatic capacitance sensor is generally used.

SUMMARY

In accordance with one aspect of the present disclosure, an image forming apparatus includes a housing, a container body, and an electrostatic capacitance sensor. The container body contains a liquid and is placed on a ground surface which is a part of the housing. The electrostatic capacitance sensor detects a change in capacitance between a side surface of the container body and the ground surface to determine a change in quantity of the liquid in the container body. The top surface of the container body is a part of the housing. The top surface and the ground surface are in electrically conductive state, a distance between the top surface and the electrostatic capacitance sensor is longer than a distance between the ground surface and the electrostatic capacitance sensor, or the top surface and the ground surface are electrically insulated, or the top surface is opened.

In accordance with an aspect of the present disclosure, a liquid tank includes a container body, an electrostatic capacitance sensor, and a supply port. The container body contains a liquid and is placed on a ground surface. The electrostatic capacitance sensor detects a change in capacitance between the electrostatic capacitance sensor and the ground surface to determine a change in quantity of the liquid in the container body. The supply port is formed in the container body below a liquid level at a time of emptying when it is determined that the container body is empty on the basis of a detection result of the electrostatic capacitance sensor. The container body has a blank part in which the liquid is not contained, below the liquid level at the time of emptying.

In accordance with another aspect of the present disclosure, an image forming apparatus includes a head unit provided with a recording head; a conveyance unit which conveys a sheet; a cleaning unit which cleans the recording head; and the liquid tank in which a cleaning liquid supplied to the cleaning unit is contained.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, a liquid tank and an image forming apparatus according to one embodiment of the present disclosure will be described.

Figure 1:
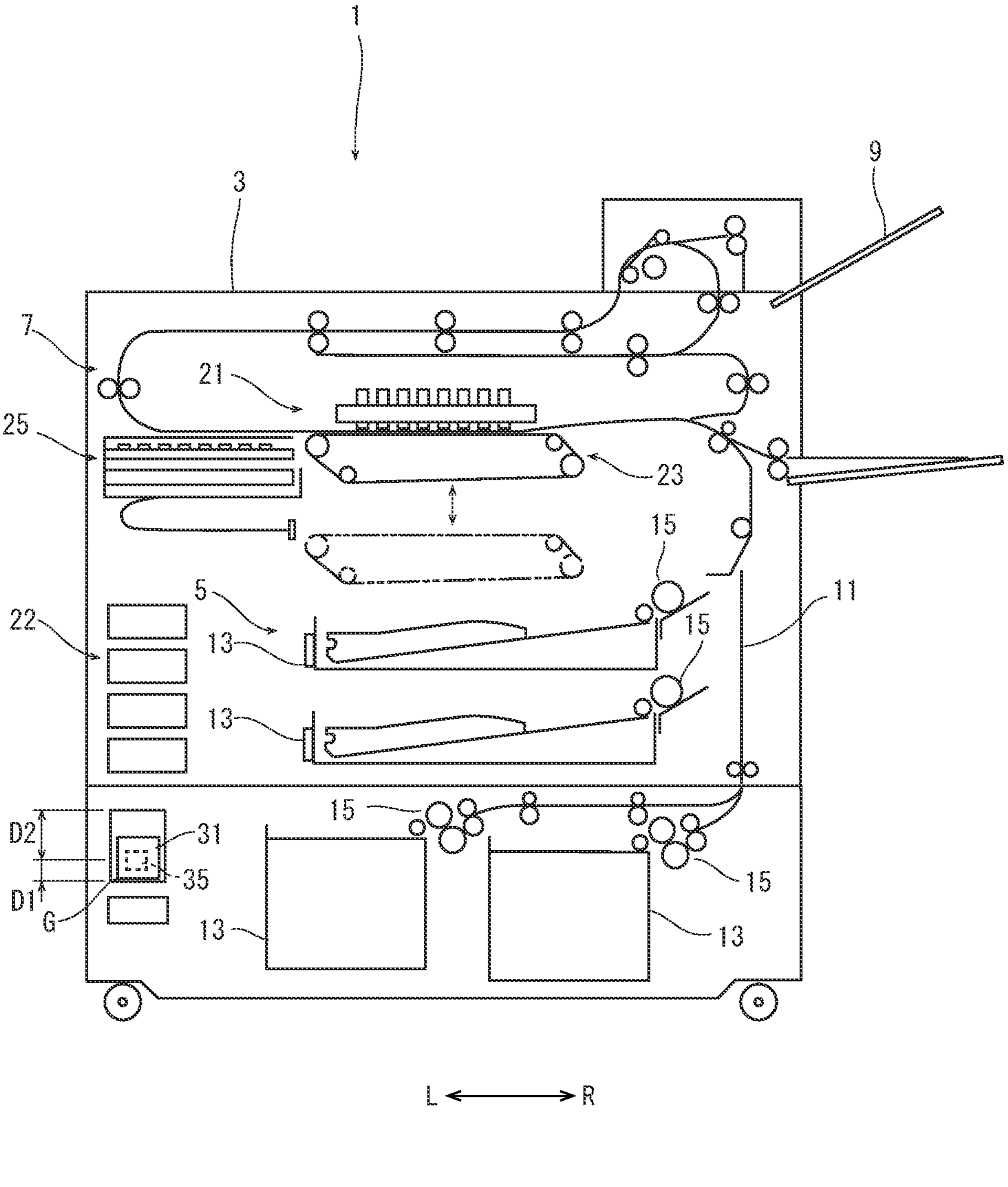
FIG. 1 is a front view schematically showing an inner structure of an image forming apparatus according to one embodiment of the present disclosure.

First, with reference to FIG. 1, the image forming apparatus 1 will be described. FIG. 1 is a front view schematically showing an inner structure of the image forming apparatus 1. In the following description, a front side of a paper plane on which FIG. 1 is drawn is defined as a front side of the image forming apparatus 1. L and R marked in each drawing indicate the left side and the right side of the image forming apparatus 1.

In an apparatus main body 3 (an example of a housing in the present disclosure) of the image forming apparatus 1, a sheet feeding part 5, an inkjet type image forming part 7, and a discharge tray 9 are provided. Further, in the apparatus main body 3, a conveyance path 11 along which a sheet is conveyed is formed from the sheet feeding part 5 to the discharge tray 9 through the image forming part 7. Major structure components of the apparatus main body 3 are made of metal, and the components are in electrically conductive state. The apparatus main body 3 is grounded.

The sheet feeding part 5 is provided in the lower portion of the inside of the apparatus main body 3, and includes a plurality of sheet feeding cassettes 13 in which the sheet is stored and a plurality of sheet feeding devices 15 which feeds the sheet from the sheet feeding cassettes 13 to the conveyance path 11.

The image forming part 7 is provided in the upper portion of the inside of the apparatus main body 3, and includes a head unit 21 which performs a printing operation, a conveyance unit 23 which conveys the sheet, and a cleaning unit 25 which cleans the head unit 21.

The head unit 21 includes four recording heads corresponding to inks of four colors. Each recording head is connected to an ink tank 22 storing the ink of the corresponding color.

The conveyance unit 23 includes an endless conveyance belt traveling in the predetermined direction to convey the sheet. The conveyance unit 23 is lifted and lowered between a printing position (see the solid line in FIG. 1) where the sheet conveyance surface of the conveyance belt is positioned below the head unit 21 and a retreat position (see the two-dot chain line in FIG. 1) where the sheet conveyance surface of the conveyance belt is separated downward from the head unit 21 farther than the printing position.

The cleaning unit 25 includes caps which cover the recording heads of the head unit 21 and wipers which clean the recording heads. The cleaning unit 25 is supported in a movable manner between a cleaning position below the head unit 21 and a retreat position separated leftward from the head unit 21. To the cleaning unit 25, a cleaning liquid tank 31 in which a cleaning liquid for cleaning the recording head is contained is connected. The cleaning liquid tank 31 is detachably attached to a storage part provided in the lower portion of the inside the apparatus main body 2, for example. The storage part is a parallelepiped space surrounded by the top surface, the bottom surface, the left side surface, the right side surface and the rear surface, and the front surface of the space is opened, for example. The cleaning liquid tank is an example of a liquid tank in the present disclosure. The cleaning liquid tank 31 will be described later.

At a time of an image forming operation, the conveyance unit 23 is lifted from the retreat position to the printing position. The sheet fed from the sheet feeding cassette 13 by the corresponding sheet feeding device 15 in the sheet feeding part 5 is conveyed to the image forming part 7 along the conveyance path 11. In the image forming part 7, when the sheet is passed below the head unit 21, the ink is ejected from the recording heads of the head unit 21 on the sheet, and an image is formed on the sheet. The sheet on which the image is formed is conveyed along the conveyance path 11 and then discharged on the discharge tray 9.

When the recording heads of the head unit 21 are cleaned, the conveyance unit 23 is moved from the printing position to the retreat position, and then the cleaning unit 25 is moved from the retreat position to the cleaning position. The description of the cleaning operation is omitted.

Figure 2:
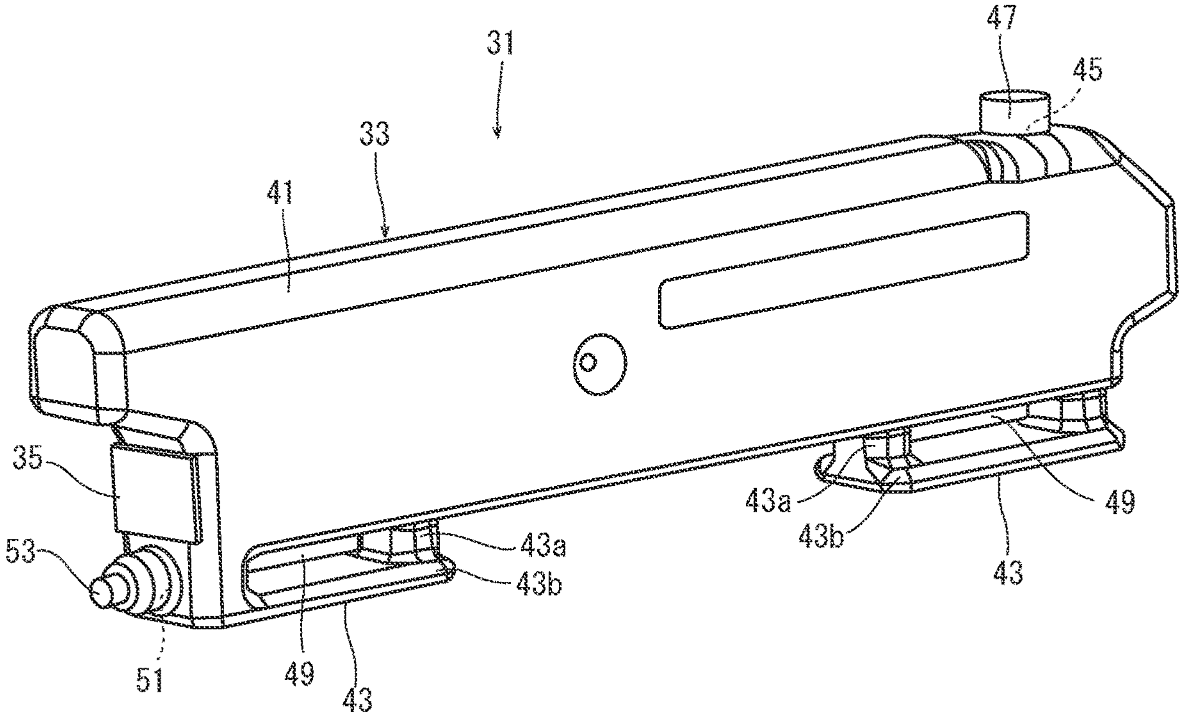
FIG. 2 is a perspective view showing a cleaning liquid tank according to the embodiment of the present disclosure.
Figure 3:
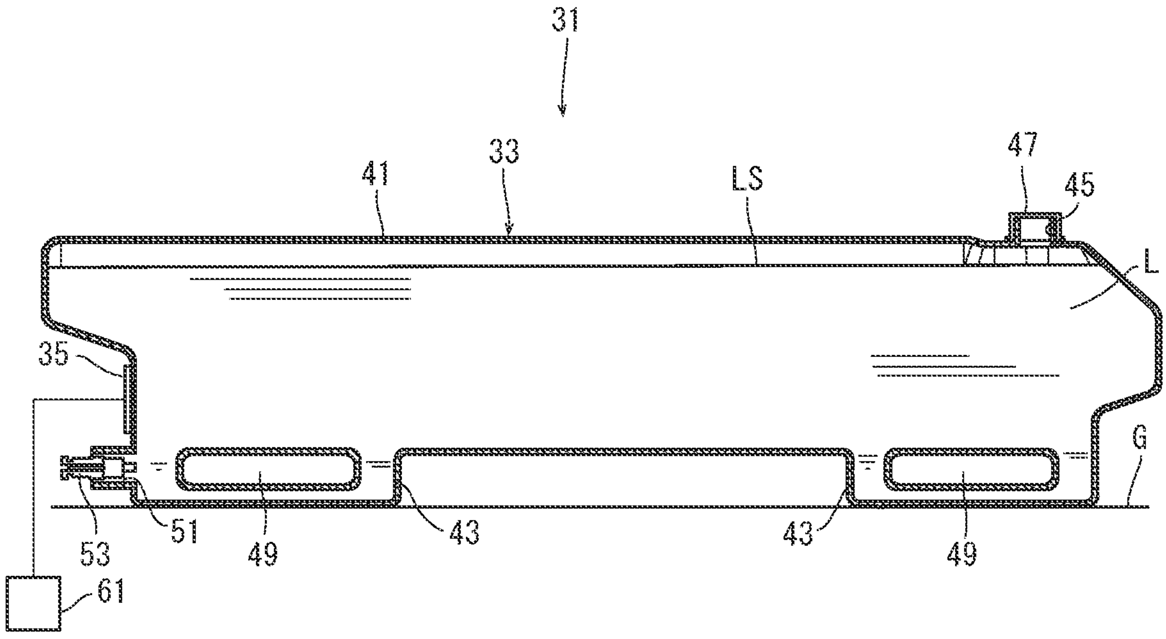
FIG. 3 is a sectional view showing the cleaning liquid tank according to the embodiment of the present disclosure, when it is full.
Figure 4:
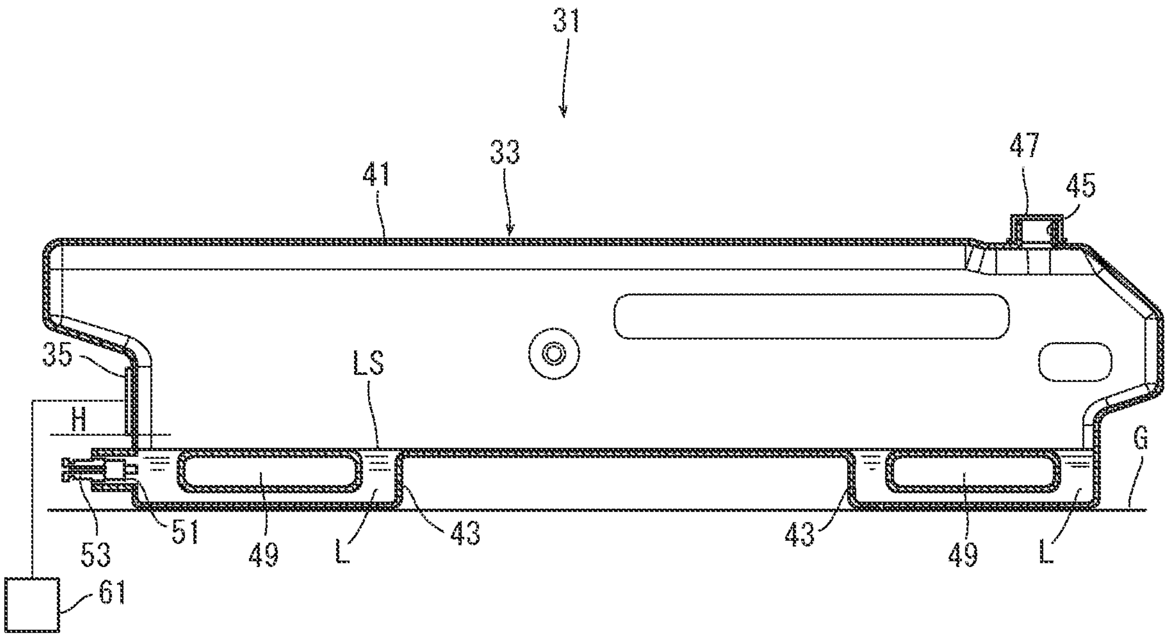
FIG. 4 is a sectional view showing the cleaning liquid tank according to the embodiment of the present disclosure, when it is empty.

Next, with reference to FIG. 2 to FIG. 4, the cleaning liquid tank 31 will be described. FIG. 2 is a perspective view showing the cleaning liquid tank 31, FIG. 3 is a sectional view showing the cleaning liquid tank 31 when it is full, and FIG. 4 is a sectional view showing the cleaning liquid tank 31 when it is empty.

The cleaning liquid tank 31 includes a container body 33 in which a liquid (the cleaning liquid) is contained, and an electrostatic capacitance sensor 35 which detects a remaining quantity of the liquid in the container body 33. The electrostatic capacitance sensor 35 may be provided in the apparatus main body 3.

The container body 33 has a hollow parallelepiped shape long in the horizontal direction, and has a body part 41 and two leg parts 43 provided at both end portions in the longitudinal direction of the body part 41. The inside of the body part 41 and the insides of the two leg parts 43 communicate with each other. The body part 41 and the two leg parts 43 have a constant thickness. The container body 33 is attached to and detached from the storage part of the apparatus main body 2 along the longitudinal direction. When the container body 33 is attached to the storage part of the apparatus main body 2, the lower surfaces of the two leg parts 43 are placed on the lower surface of the storage part of the apparatus main body 3 (see FIG. 3 and FIG. 4, the lower surface of the storage part is an example a ground surface in the present disclosure, hereinafter referred to as a ground surface G).

In the upper wall of the body part 41, an inflow port 45 is formed at one end portion in the longitudinal direction (the end portion on the front side in the attachment direction). The liquid is injected into the container body 33 through the inflow port 45. The inflow 45 is closed by a cap 47.

Each of the two leg parts 43 is a parallelepiped shape long in the horizontal direction, and has an upper portion **43*a* and a lower portion 43*b* having a larger cross-sectional area than the upper portion 43*a*, as shown in FIG. 2. The lower surface of the lower portion 43*b* is formed in a flat surface. When the container body 33 is attached to the storage part of the apparatus main body 3, the lower surfaces are grounded to the ground surface G (see FIG. 3 and FIG. 4). In each of the upper portions 43*a* of the two leg parts 43, a through-hole 49 is formed along the lateral direction of the container body 33. The through-hole 49 has a parallelepiped shape long in the horizontal direction along the leg part 43. The through-hole 49** is an example of a blank part in the present disclosure.

In the leg part 43 formed at the other end portion in the longitudinal direction (the end portion on the rear side in the attachment direction), a supply port 51 is formed on the lower end portion of the side wall. The supply port 51 is closed by a coupling 53. When the container body 33 is attached to the storage part of the apparatus main body 3, the coupling 53 is coupled to a coupling (not shown) of the apparatus main body 3 so that the supply port 51 is opened.

The electrostatic capacitance sensor 35 is attached to the container body 33. More specifically, the electrostatic capacitance sensor 35 is attached on the outer surface of the side wall of the body part 41 on the rear side in the attachment direction in such a manner that the lowermost height H (see FIG. 4) of the detection surface (within the height range of the sensor 35) is slightly higher than the height of the liquid level LS when the liquid L is contained to the lowest height at which the supply port 51 is closed (the top surface of the leg part 43, the bottom surface of the body part 41). The electrostatic capacitance sensor 35 detects a change in capacitance due to the quantity of liquid between the detection surface and the ground surface G. The detection result of the electrostatic capacitance sensor 35 is transmitted to a controller 61 (see FIG. 3 and FIG. 4).

Based on the detection result of the electrostatic capacitance sensor 35, the controller 61 determines that the container body 33 is empty when it is determined that the liquid L is filled only in the leg parts 43 and the liquid level LS is lowered to the lowest height at which the supply port 51 is closed by the liquid L, as shown in FIG. 4 (the top surface of the leg parts 43 and the bottom surface of the body part 41).

As described above, the electrostatic capacitance sensor 35 detects a change in capacitance due to the quantity of liquid between the detection surface and the ground surface G. When the height of the liquid level LS becomes lower than the lowest height H of the detection surface (see FIG. 4), the measured capacitance always becomes the same value, and the change in capacitance is not detected. As described above, the electrostatic capacitance sensor 35 is disposed such that the lowest height H of the detection surface is slightly higher than the liquid level LS at the time of emptying. That is, when the liquid L is consumed until the height of the liquid level LS becomes lower than the lowest height H of the detection surface, the change in capacitance is not detected. The controller 61 determines that the container body 33 is empty based on the detection result of the electrostatic capacitance sensor 35 when the change in capacitance is not detected.

The states when the cleaning liquid tank 31 having the above configuration is full and empty will be described. As described above, the cleaning liquid tank 31 is attached to the storage part of the apparatus main body 3, and the lower surfaces of the two leg parts 43 are grounded to the ground surface G of the storage part. At this time, as shown in FIG. 1, a distance D1 between the electrostatic capacitance sensor 35 and the ground surface G is shorter than a distance D2 between the electrostatic capacitance sensor 35 and the top surface of the storage part. Therefore, the electrostatic capacitance sensor 35 detects the capacitance between the electrostatic capacitance sensor 35 and the ground surface G, not the capacitance between the electrostatic capacitance sensor 35 and the top surface. Further, the distance between the electrostatic capacitance sensor 35 and the ground surface G may be shorter than the distance between the electrostatic capacitance sensor 35 and the surface other than the ground surface G (the top surface, the left side surface, the right side surface, and the rear surface of the storage part). Thus, the electrostatic capacitance sensor 35 mainly detects the capacitance between the electrostatic capacitance sensor 35 and the ground surface G.

When the cleaning liquid tank 31 is full as shown in FIG. 3, the liquid L is filled in the container body 33 (the body part 41 and the leg parts 43) until the liquid level LS is positioned close to the upper wall of the body part 41.

As shown in FIG. 4, when the liquid L is consumed until the liquid level LS becomes lower than the lowest height H of the detection surface of the electrostatic capacitance sensor 35, the capacitance measured by the electrostatic capacitance sensor 35 becomes constant. When the change in capacitance is no longer detected, the controller 61 determines that the container body 33 is empty. Since the liquid level LS is above the supply port 51 at the time of emptying, air can be prevented from entering from the supply port 51 at the time of the next liquid supplying.

When determining that the container body 33 is empty, the controller 61 displays a message indicating that the cleaning liquid tank 31 is empty on a display unit (not shown). When it is determined that the cleaning liquid tank 31 is empty, the cleaning liquid tank 31 is replaced in order to prevent contamination of foreign matters. That is, the liquid remaining at the time of emptying is discarded.

As is clear from the above description, since the cleaning liquid tank 31 of the present invention has the through-holes 49 formed in the leg parts 43 in which the liquid L remains at the time of emptying, the remaining quantity of the liquid L, that is, the quantity of the liquid discarded at the time of emptying can be reduced by the volume of the through-holes 49.

As described above, the electrostatic capacitance sensor 35 measures the capacitance between the lower surfaces of the two leg parts 43 and the ground surface G. Since the contact area between the two leg parts 43 and the ground surface G is relatively large, the sensitivity of the electrostatic capacitance sensor 35 can be increased, and the remaining quantity can be obtained more accurately. In this case, since the distance between the electrostatic capacitance sensor 35 and the ground surface G is shorter than the distance between the electrostatic capacitance sensor 35 and the surface other than the ground surface G (the top surface, the left side surface, the right side surface and the rear surface of the storage part), the capacitance of the space containing the cleaning liquid existing between the electrostatic capacitance sensor 35 and the ground surface G can be accurately detected.

Further, as shown in FIG. 4, the electrostatic capacitance sensor 35 is disposed such that the lowest height H of the detection surface is slightly higher than the liquid level LS at the time of emptying, so that the distance between the detection surface and the ground surface can be shortened. Therefore, it becomes possible to reduce the detection error of the electrostatic capacitance sensor 35. Further, the electrostatic capacitance sensor 35 is attached to the outer surface of the side wall of the container body 33 because it detects the remaining quantity in a non-contact manner. Therefore, the electric wire and the signal wire connecting the electrostatic capacitance sensor 35 to a power source can be easily treated, and the durability of them is improved.

It is also possible to reduce the remaining quantity by making the entire leg parts 43 solid. However, the thickness of the wall of the cleaning liquid tank 31 affects the capacitance (the resistance value) detected by the electrostatic capacitance sensor 35, and the accuracy of the electrostatic capacitance sensor 35 increases as the thickness of the wall of the cleaning liquid tank 31 decreases. When the leg parts 43 are made solid, the resistance value of the leg parts 43 affects the detection value of the electrostatic capacitance sensor 35, so that the detection accuracy is deteriorated. Therefore, the thickness of the wall of the container body 33 is preferably as thin as possible.

The leg part 43 may be provided with a solid portion instead of the through-hole 49 as a blank part. In this case, the remaining quantity of the liquid can be reduced by the volume of the solid portions. However, in consideration of moldability and weight, the blank part is preferably the through-hole 49 (the cavity).

Further, since the two leg parts 43 are provided below the liquid level LS at the time of emptying and the supply port 51 is formed in the leg part 43, the volume of the container body 33 below the liquid level LS can be reduced, and the remaining quantity at the time of emptying can be reduced. However, the leg parts 43 is not necessarily provided. In this case, one or more blank parts are formed below the liquid level LS at the time of emptying.

The top surface of the storage part of the apparatus main body 3 may be electrically insulated from the apparatus main body 3. This may include a case where the top surface is made of insulator, the apparatus main body 3 does not exist above the storage part, or the top surface of the storage part may be opened.

Although the invention has been described with respect to specific embodiments, the invention is not limited to the above embodiments. Those skilled in the art may modify the embodiments described above without departing from the scope and spirit of the invention.

The invention claimed is:

1. An image forming apparatus comprising:

a housing;

a container body containing a liquid and placed on a ground surface which is a part of the housing; and an electrostatic capacitance sensor which detects a change in capacitance between a side surface of the container body and the ground surface to determine a change in quantity of the liquid in the container body, wherein the container body has a supply port formed below a liquid level at a time of emptying when it is determined that the container body is empty on the basis of a detection result of the electrostatic capacitance sensor, and the container body has a blank part in which the liquid is not contained, below the liquid level at the time of emptying, and a top surface of the container body is a part of the housing, and the top surface meets at least one of the following conditions a) to c), a) the top surface and the ground surface are in electrically conductive state, a distance between the top surface and the electrostatic capacitance sensor is longer than a distance between the ground surface and the electrostatic capacitance sensor, b) the top surface and the ground surface are electrically insulated, and c) the top surface is opened.

2. The image forming apparatus according to claim 1, wherein the blank part is a cavity.

3. The image forming apparatus according to claim 1, wherein the container body has a body part and a leg part placed on the ground surface, and the blank part is formed in the leg part.

4. The image forming apparatus according to claim 3, wherein the electrostatic capacitance sensor is attached to the body part, and the supply port is formed in the leg part.

5. The image forming apparatus according to claim 3, wherein the blank part penetrates the leg part.

6. The image forming apparatus according to claim 1, wherein a lowest height of a detection surface of the electrostatic capacitance sensor is higher than a height of the liquid level when the liquid is contained until the supply port is closed.

7. The image forming apparatus according to claim 1, wherein the liquid is a cleaning liquid for cleaning a recording head of the image forming apparatus.

8. The image forming apparatus according to claim 7, further comprising:

a head unit provided with the recording head;

a conveyance unit which conveys a sheet; and a cleaning unit which cleans the recording head.

9. A liquid tank comprising:

a container body containing a liquid and placed on a ground surface;

an electrostatic capacitance sensor which detects a change in capacitance between the electrostatic capacitance sensor and the ground surface to determine a change in quantity of the liquid in the container body; and a supply port formed in the container body below a liquid level at a time of emptying when it is determined that the container body is empty on the basis of a detection result of the electrostatic capacitance sensor, and the container body has a blank part in which the liquid is not contained, below the liquid level at the time of emptying.

10. The liquid tank according to claim 9, wherein the blank part is a cavity.

11. The liquid tank according to claim 9, wherein the container body has a body part and a leg part placed on the ground surface, and the blank part is formed in the leg part.

12. The liquid tank according to claim 11, wherein the electrostatic capacitance sensor is attached to the body part, and the supply port is formed in the leg part.

13. The liquid tank according to claim 11, wherein the blank part penetrates the leg part.

14. The liquid tank according to claim 9, wherein a lowest height of a detection surface of the electrostatic capacitance sensor is higher than a height of the liquid level when the liquid is stored until the supply port is closed.

15. The liquid tank according to claim 9, wherein the liquid is a cleaning liquid for cleaning a recording head of the image forming apparatus.

16. An image forming apparatus comprising:

a head unit provided with a recording head;

a conveyance unit which conveys a sheet;

a cleaning unit which cleans the recording head; and the liquid tank according to claim 15, in which a cleaning liquid supplied to the cleaning unit is contained.

* * * * *